(12) United States Patent
Oelschlaegel

(10) Patent No.: US 8,741,138 B2
(45) Date of Patent: Jun. 3, 2014

(54) FILTER WITH END CAP FEATURES

(75) Inventor: Victor R. Oelschlaegel, Oakdale, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 527 days.

(21) Appl. No.: 13/070,904

(22) Filed: Mar. 24, 2011

(65) Prior Publication Data

US 2011/0259808 A1 Oct. 27, 2011

Related U.S. Application Data

(60) Provisional application No. 61/328,439, filed on Apr. 27, 2010.

(51) Int. Cl.
*B01D 27/00* (2006.01)
*B01D 27/08* (2006.01)
*B01D 35/30* (2006.01)

(52) U.S. Cl.
CPC ............... *B01D 27/00* (2013.01); *B01D 27/08* (2013.01); *B01D 35/30* (2013.01)
USPC ........................................ 210/232; 210/493.2

(58) Field of Classification Search
CPC ......... B01D 27/00; B01D 27/08; B01D 35/30
USPC ............................................. 210/232, 493.2
See application file for complete search history.

(56) References Cited

U.S. PATENT DOCUMENTS

| | | | |
|---|---|---|---|
| 2,873,029 A * | 2/1959 | Humbert, Jr. ................ | 210/440 |
| 3,217,942 A * | 11/1965 | Humbert, Jr. et al. ... | 222/189.06 |
| 4,626,348 A | 12/1986 | Stone | |
| 4,668,393 A | 5/1987 | Stone | |
| 4,740,299 A | 4/1988 | Popoff et al. | |
| 5,490,930 A * | 2/1996 | Krull ............................ | 210/443 |
| 5,643,466 A | 7/1997 | Strapp | |
| 6,171,491 B1 | 1/2001 | Popoff et al. | |

* cited by examiner

*Primary Examiner* — Thomas M Lithgow
(74) *Attorney, Agent, or Firm* — Christopher H. Hunter

(57) ABSTRACT

A filter element is removably supported within a housing comprising a filter head and a collection bowl. The element is removed from the lower end of the housing when the collection bowl is removed. The element includes an annular side wall which supports the element on radial ribs within the collection bowl; and a series of projections or posts which engage ribs on the bowl and cause the element to rotate in conjunction with the bowl when the collection bowl is screwed off of the head. The rotation of the element breaks the seal stiction between an upper seal on the element and the filter head, such that the element remains with the bowl. Openings around the sidewall facilitate fluid flow around the lower end cap. The element is supported by the collection bowl as the bowl is removed, and easily removed from the bowl and replaced.

12 Claims, 8 Drawing Sheets

FILTER WITH END CAP FEATURES

CROSS-REFERENCE TO RELATED APPLICATIONS

The present application claims the benefit of the filing date of U.S. Provisional Ser. No. 61/328,439, filed Apr. 27, 2010, the disclosure of which is incorporated herein by reference in its entirety.

FIELD OF THE INVENTION

The present invention relates generally to filter assemblies for filtering fluid, and more particularly to fuel filter assemblies and replaceable elements for filtering diesel fuel in a combustion engine.

BACKGROUND OF THE INVENTION

Fuel filter elements supported within a housing, where the housing includes a head and a removable collection bowl, are known, for example, from U.S. Pat. No. 4,626,348. The head includes inlet and outlet ports, and the element is located such that fuel entering the assembly flows between the housing and the element, and then passes inwardly through the filter media for removal of contaminants such as particulate and water. The collection bowl, which is typically transparent, is supported below the head, and is threadably attached to the housing. The bowl includes a drain in its lower end that enables a user to remove water periodically from the collection bowl, as the water is separated from the fuel flowing through the media. A heater element can also be included in the collection bowl, which is used during cold-weather operation, and heats the fuel to facilitate the fuel flowing through the media and then on through the fuel system.

In certain of these assemblies, for example as shown in U.S. Pat. No. 4,626,348, the element is screwed onto a threaded spud depending downwardly from the filter head. A space or gap is provided between the lower end cap of the element and the inside walls of the housing to allow fluid flow into the lower portion of the bowl, where the water collects and can be removed. The lower end cap includes radial ridges which support the element on a shoulder or other support surface in the housing. The element in the '348 patent is retained within a "spin-on" cartridge, and replaced as a unit with other components of the housing. That is, the element cannot be separately removed from the housing and replaced. The lower end cap and walls of the housing include cooperating structure which prevent the element from rotating within the housing, as the collection bowl is directly screwed onto the lower end cap of the element. The collection bowl is attached to the assembly by threads on an internal cylindrical wall of the bowl being received on cooperating threads on a central spud depending downwardly from the lower end cap of the element.

Other assemblies are known, for example as shown in U.S. Pat. No. 4,668,393, where the collection bowl is attached directly to the walls of the housing, rather than to the element. In these case, the housing includes threads provided, e.g., in an attachment ring supported at the distal end of the housing. The collection bowl attaches to these threads, and also forms a seal with the element such that the fluid can pass properly from the periphery of the element into the collection bowl. Radial ridges on the lower surface of the lower end cap support the element on a shoulder formed by the attachment ring, and provide radial channels for flow. The ridges also project radially outward from the periphery of the lower end cap to properly space and align the element within the housing.

U.S. Pat. No. 4,740,299 shows a similar structure incorporating a threaded connecting ring; while U.S. Pat. No. 5,643,466 shows the filter element having radial projections on its lower end cap which support the filter within a shoulder of the can. In the '446 patent the opposite end cap includes an axial projection which engages a valve element to open a flow path through the assembly when a proper element is attached to the filter head.

U.S. Pat. No. 6,171,491 shows still further embodiments where a filter element is supported within the housing, where the housing is a "spin-on" type of cartridge (that is, the element and components of the housing remain together as a unit); and also shows embodiments where the element is removed from the housing when the element is spent, such as being temporarily connected to a threaded cover for the housing, and removed from the upper end of the housing.

SUMMARY OF THE INVENTION

The present invention provides a filter assembly having a filter element that is removably supported within the housing of the assembly. A seal is provided between the upper end of the element and the head of the filter housing to fluidly separate the incoming, dirty fuel from the outgoing, clean fuel. The element is removed from the lower end of the housing when the collection bowl is removed. The element includes i) a locating feature which supports the element within the collection bowl of the housing when the bowl is attached to the filter head; ii) and a rotation feature which causes the element to rotate in conjunction with the collection bowl when the collection bowl is screwed off of the head. The rotation of the element during disassembly breaks the seal stiction between the upper seal on the element and the filter head, such that the element does not remain stuck to the head when the bowl is removed. In this way, the element remains supported by the collection bowl as the bowl is removed, and can be easily removed from the bowl and replaced with a fresh element without spillage of fuel.

According to one aspect, the assembly includes a housing having a filter head with an inlet port and outlet port for directing fuel into and out of the housing, and a bowl threadably attached to a lower end of the head, the bowl including a series of ribs projecting radially inward from an internal sidewall of the bowl. The filter element is located within the housing, and includes: i) a ring of filter media circumscribing a central axis and defining a central cavity interiorly of the ring; ii) a first end cap sealingly bonded to a lower end of the media ring; and iii) a second, annular end cap sealingly bonded to an upper end of the media ring and having a flow passage allowing fluid communication with the central cavity of the element. The upper end cap includes an axial projection which engages a valve in the filter head to open a flow path through the filter assembly when the filter assembly is properly attached to the head.

The lower end cap of the filter element includes a) an imperforate circular end wall with an inner surface facing the media ring and bonded thereto, and an outer surface facing away from the media ring, b) an annular side wall projecting outwardly from the outer surface of the end wall and extending around the periphery of the end wall, the side wall supporting the element against an upper surface of the ribs on the bowl and including arcuate segments defining a series of openings therearound, and c) a series of axial projections or posts which project downwardly from the distal end of the side wall. The projections are spaced around the side wall and the ribs on the bowl rotationally contact the posts when the bowl is rotated with respect to the head during element removal to cause the element to rotate in conjunction with the bowl. The rotation of the element breaks the seal stiction between the seal on the upper end cap of the filter element and the head, and allows the element to remain resting on the collection bowl as the collection bowl is unscrewed from the housing. When the bowl is fully unscrewed and removed from the head, the element can be removed from the bowl and a fresh element located on the bowl for installation within the housing.

A heater assembly can be provided with the housing, including a heating element located internally of the collection bowl, between the lower end of the bowl and the lower end cap of the element. The annular side wall on the lower end cap maintains a proper spacing of the element on the ribs apart from the heating element. The openings in the lower end cap facilitate fuel flow around the end cap to and from the heater for efficient heating of the fuel. The openings in the sidewall have circumferentially different spacings around the sidewall relative to the ribs on the bowl, to prevent the ribs on the bowl from being received in the openings in the end cap, and blocking fuel flow therethrough.

When the bowl and element are assembled with the head, dirty fuel in the fuel system entering through the inlet port flows between the internal sidewall of the bowl and the element and then radially inward through the media ring. Contaminants in the fuel (e.g., particulate and water) are separated by the media and the water can collect and pass downwardly between the bowl and the lower end cap into a lower portion of the bowl for removal. The filtered fuel passing through the media is then directed out through the outlet port.

DETAILED DESCRIPTION OF THE PREFERRED EMBODIMENT

Figure 1:
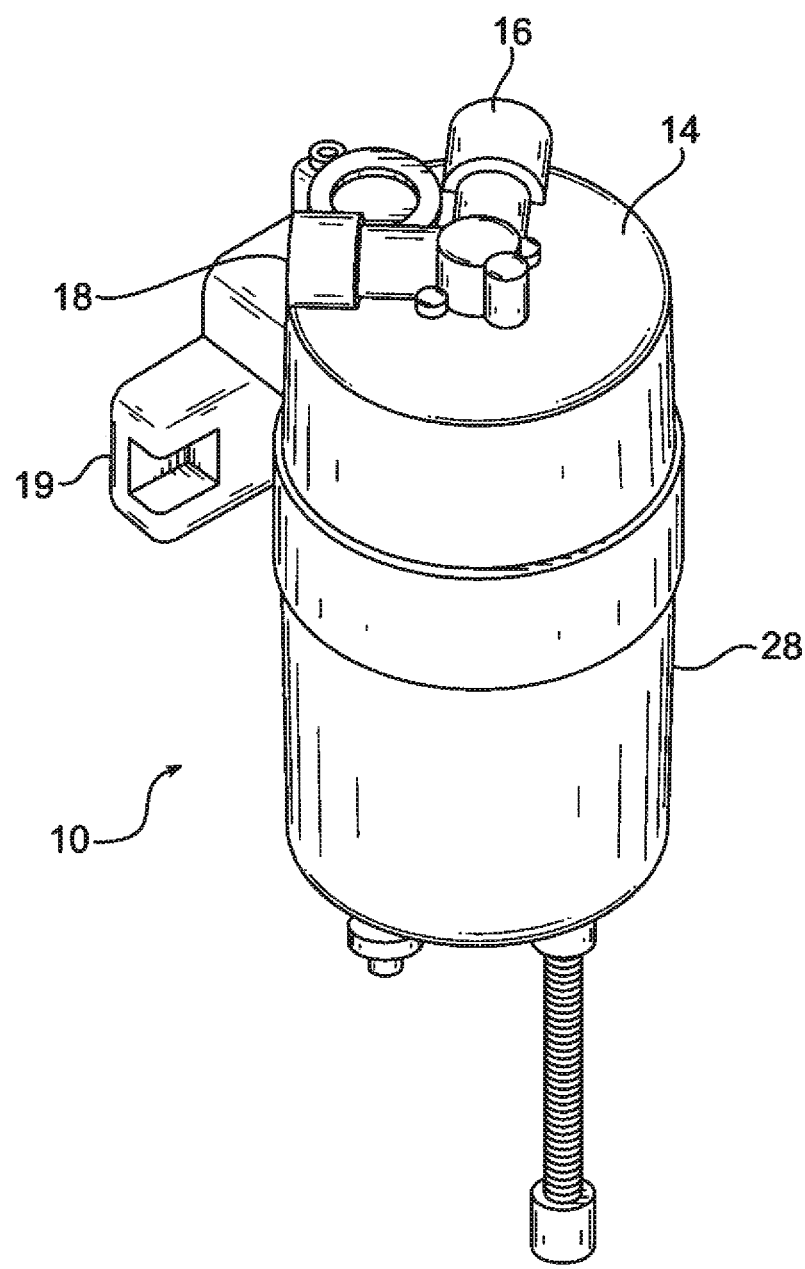
FIG. 1 is an elevated perspective view of a filter assembly constructed according to the principles of the present invention.
Figure 2:
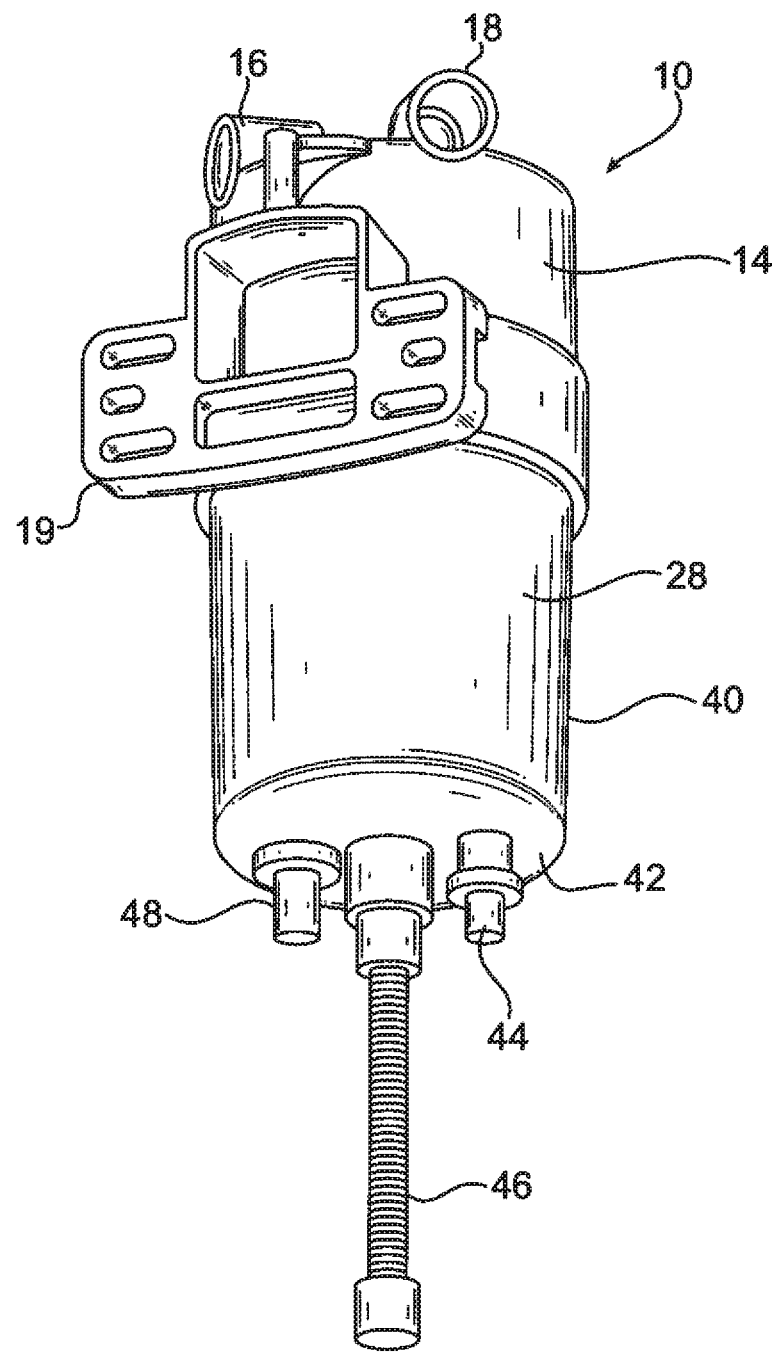
FIG. 2 is a perspective view of the filter assembly, taken from the lower end of the assembly, with the assembly rotated approximately one hundred eighty degrees from FIG. 1.

Referring now to the drawings, and initially to FIGS. 1 and 2, a filter assembly constructed according to the present invention is indicated generally at 10. The filter assembly can be used for filtering fluid, and in one application, is used for filtering diesel fuel in the fuel system of a combustion engine. The assembly 10 includes a cup-shaped metal filter head 14 with an inlet port 16 and an outlet port 18, which direct fluid into and out of the head from the fuel system. The head 14 includes a base 19 for fixedly connecting the head to an appropriate part of the engine or other support surface.

Figure 3:
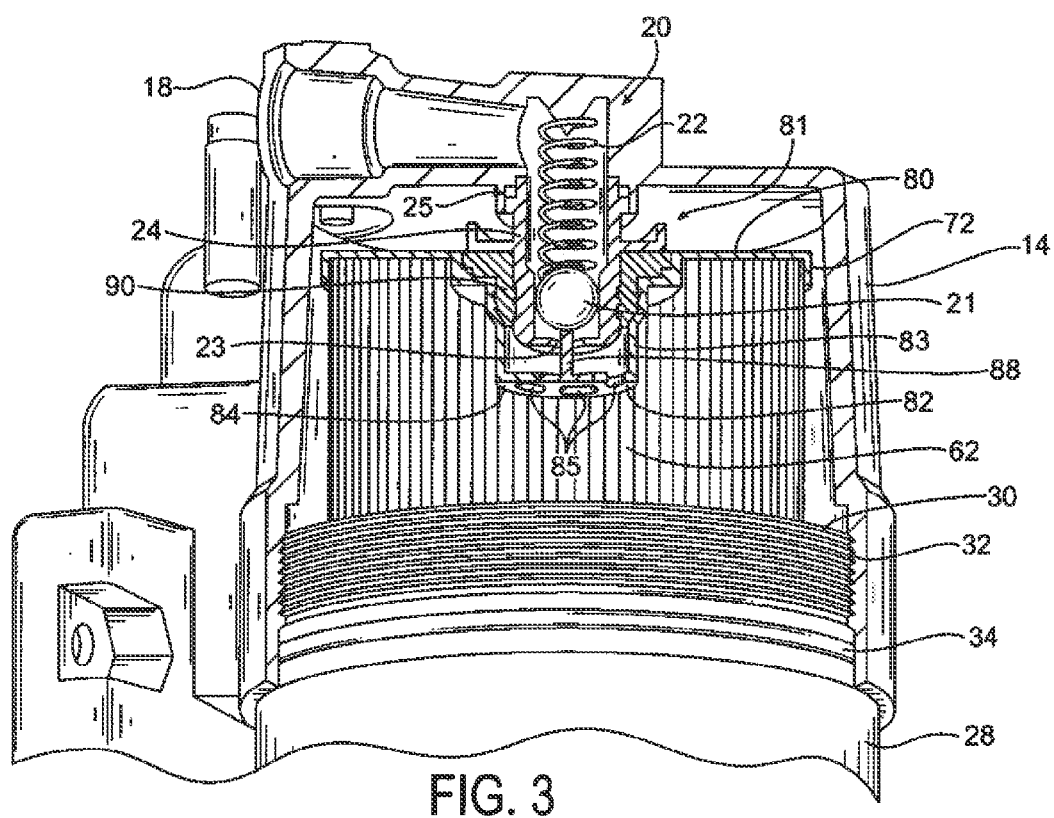
FIG. 3 is a side view of the filter head for the filter assembly of FIG. 1, shown in partial cross-section.

As shown in FIG. 3, a valve assembly, indicated generally at 20, is provided internally of the head. The valve assembly includes a ball member 21 and a compression spring 22 which urges the ball member against a valve seat 23 in an internal annular passage or spud 24 leading to the outlet port 18. The passage 24 is formed as a separate piece from the head and an O-ring 25 provides a fluid-tight seal therebetween, although these components could alternatively be formed as a single piece. As will be described more fully below, the valve assembly prevents fuel flow through the filter assembly when an incorrect element is installed in the filter assembly.

A collection bowl 28 is removably attached to the head 14, preferably by external threads 30 on an upper end of the bowl cooperating with internal threads 32 on a lower end of the head, as shown in FIG. 3. An O-ring sealing member 34 is provided between the bowl and head to provide a fluid-tight connection. As illustrated, the collection bowl could be directly attached to the head; although alternatively, a cylindrical housing wall could be separately attached to and extend downwardly from the head (as in, e.g., U.S. Pat. No. 4,626,348), and the collection bowl could be directly attached to the bottom end of the wall, as should be appreciated by those skilled in the art. In any event, collection bowl 28 is preferably formed in one piece from rigid, transparent plastic material, although other materials can of course be used depending on the particular application, as also should be known to those in the art.

Referring again to FIGS. 1 and 2, the collection bowl 28 includes a cylindrical, axially-extending sidewall 40 and a substantially flat end wall 42, spanning the sidewall. A drain assembly 44, such as the manual drain described in U.S. Pat. No. 6,258,269, can be located in the lower end wall 42, along with a water sensor or probe 46, which together provide for sensing and removing water collecting in the lower portion of the collection bowl. An electric fuel heater assembly 48 can also be provided in the lower end cap, for heating of the fuel during cold weather operation. The heater 48 includes a circular element 50, as shown in FIGS. 7 and 8, which extends inwardly into the lower end of the collection bowl, with the circular body 52 of the element supported substantially parallel to and spaced upwardly, apart from the end wall of the collection bowl.

Figure 7:
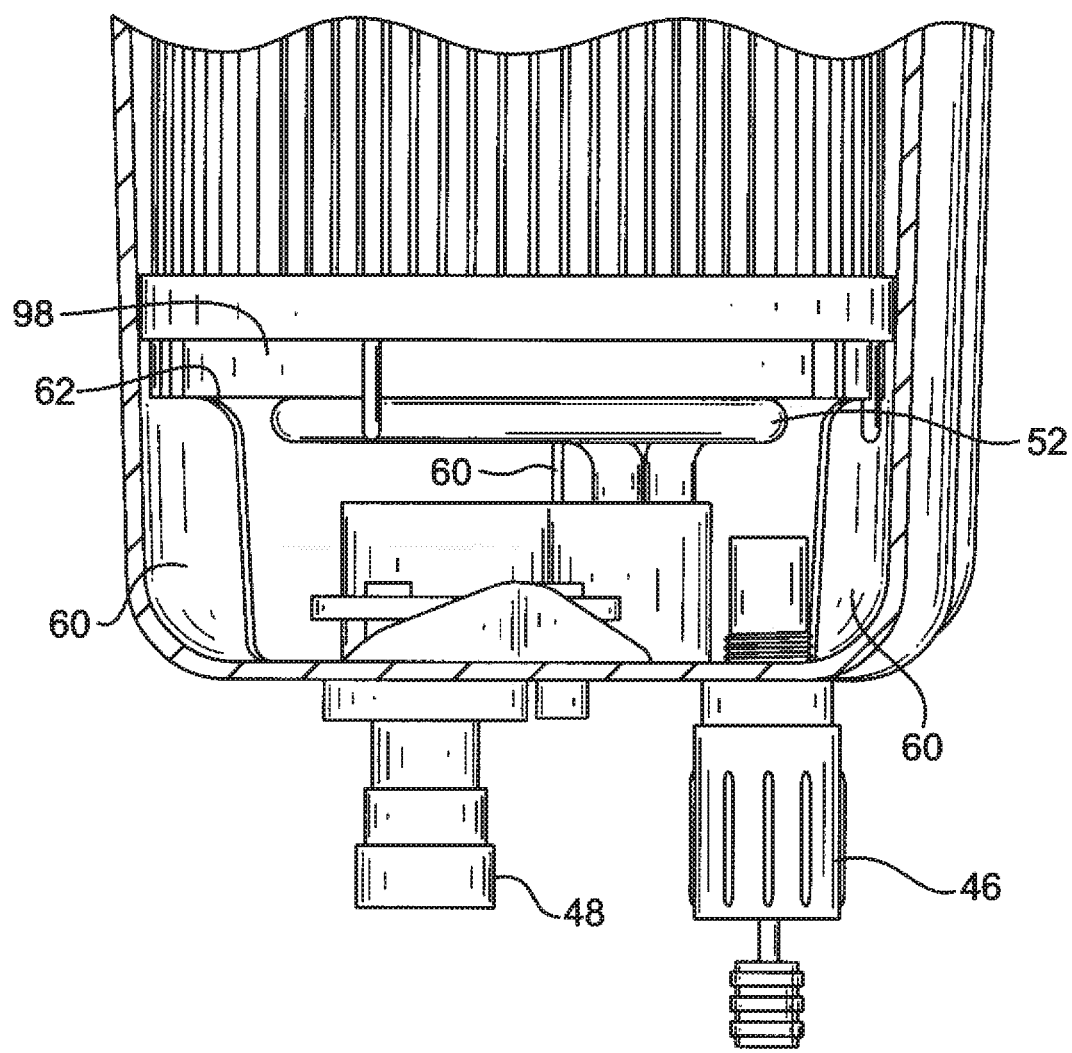
FIG. 7 is a side view of the lower end of the filter assembly of FIG. 1, shown in partial cross-section.
Figure 8:
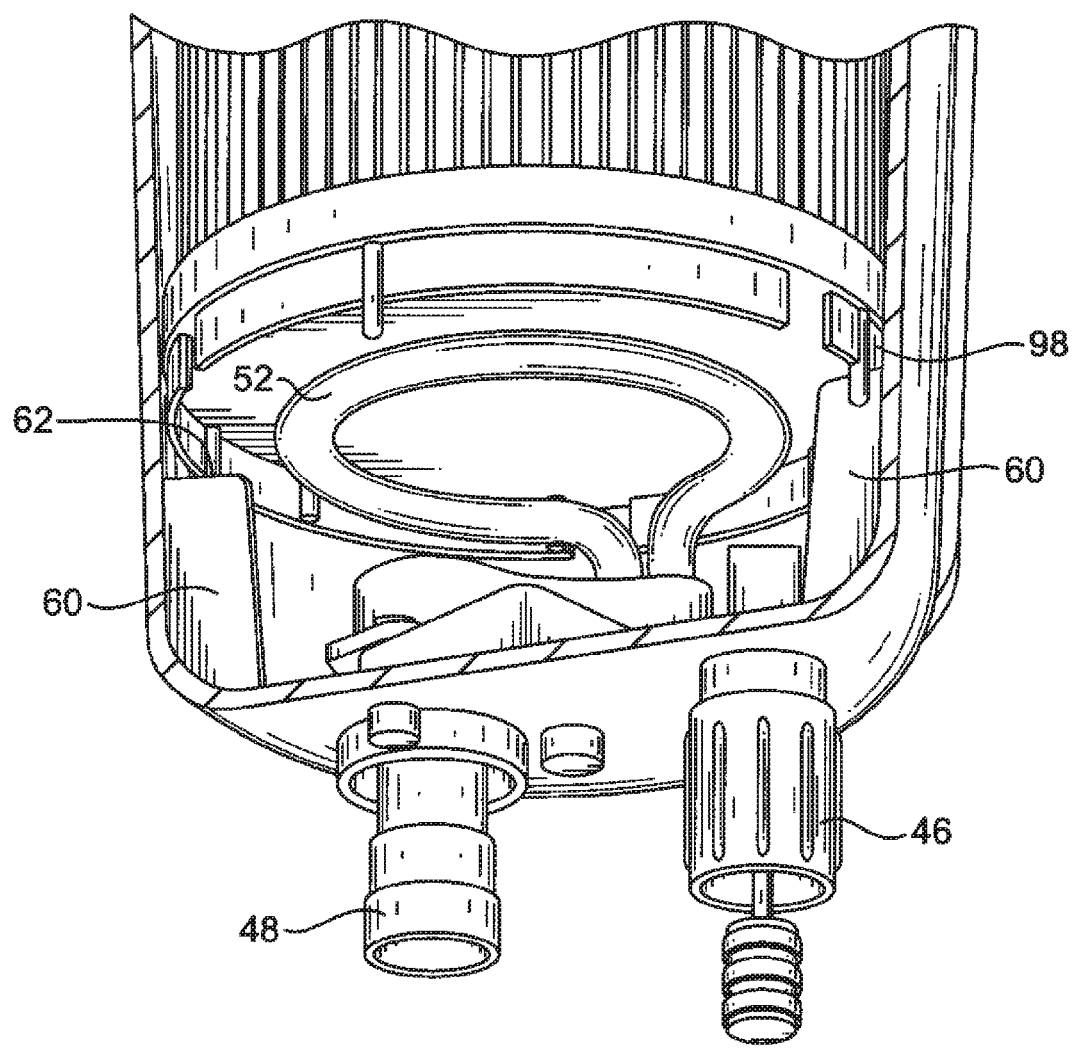
FIG. 8 is a perspective view of the lower end of the filter assembly of FIG. 1, shown in partial cross-section.

As also shown in FIGS. 7 and 8, the lower end portion of the collection bowl 28 includes a series of thin ridges or fins 60, which extend radially inward from the inner surface of the bowl a short distance toward the central axis and surround the internal components of the heater, water sensor and drain. The ridges 60 each have an upper, generally flat support surface 62, with the support surfaces 62 of the ridges all generally lying in the same plane, parallel to the bottom end wall of the collection bowl. Preferably at least three, and more preferably at least four ridges are provided in equally-spaced arrangement around the lower portion of the bowl, with each rib connected along its outer side and lower end to the bowl; although the number, spacing and dimensions of the ridges can vary with the application, and the ridges could alternatively be connected to only one of the side wall or end wall of the bowl. The ridges can be formed unitarily with the collection bowl during the manufacturing process of the bowl (e.g., such as through molding), although the ridges could of course be formed separately from the bowl and later attached thereto such as with adhesive.

Figure 4:
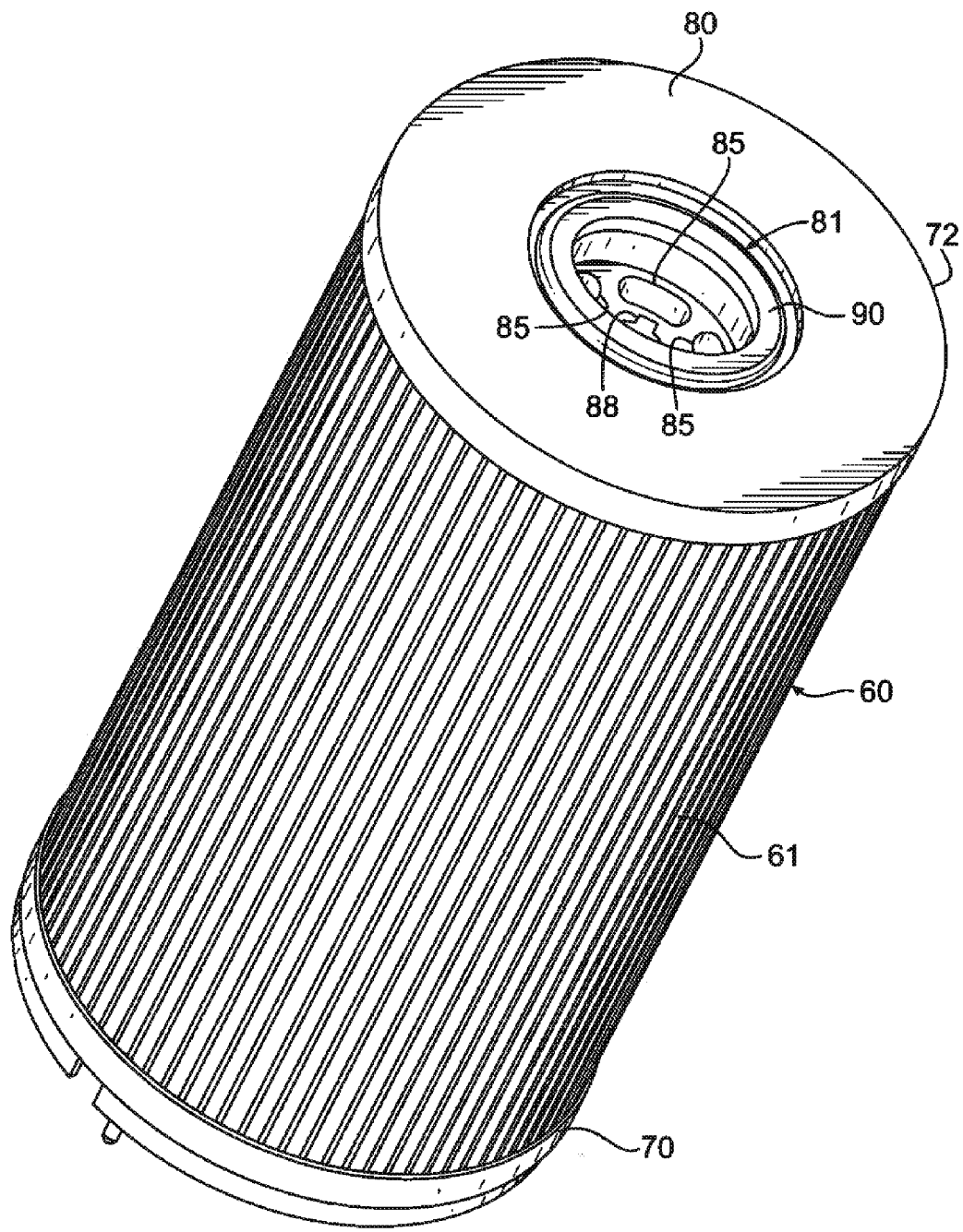
FIG. 4 is an elevated perspective view of the filter element for the filter assembly, taken from the upper end of the element.
Figure 5:
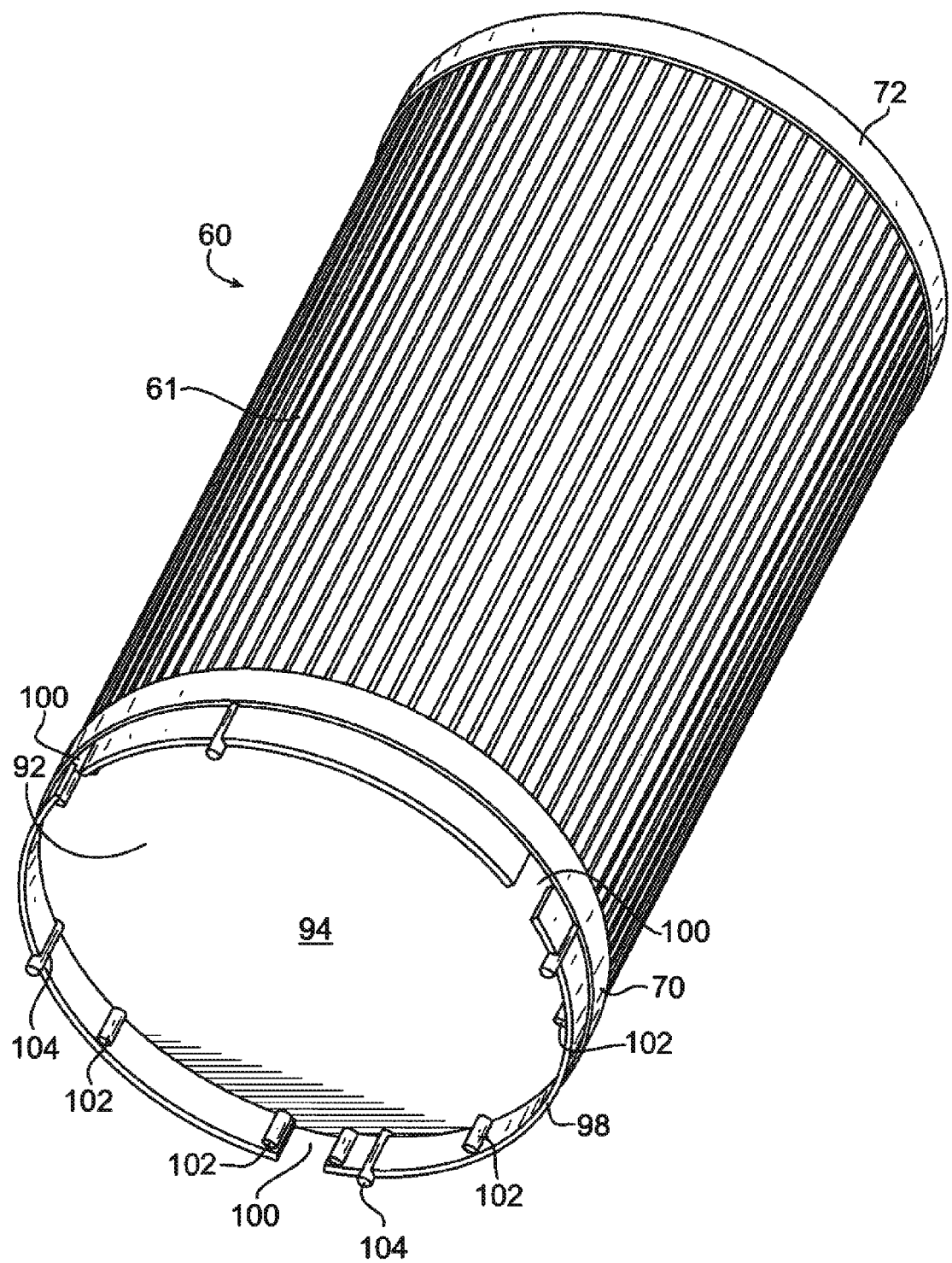
FIG. 5 is a perspective view of the filter element, taken from the lower end of the element.
Figure 6:
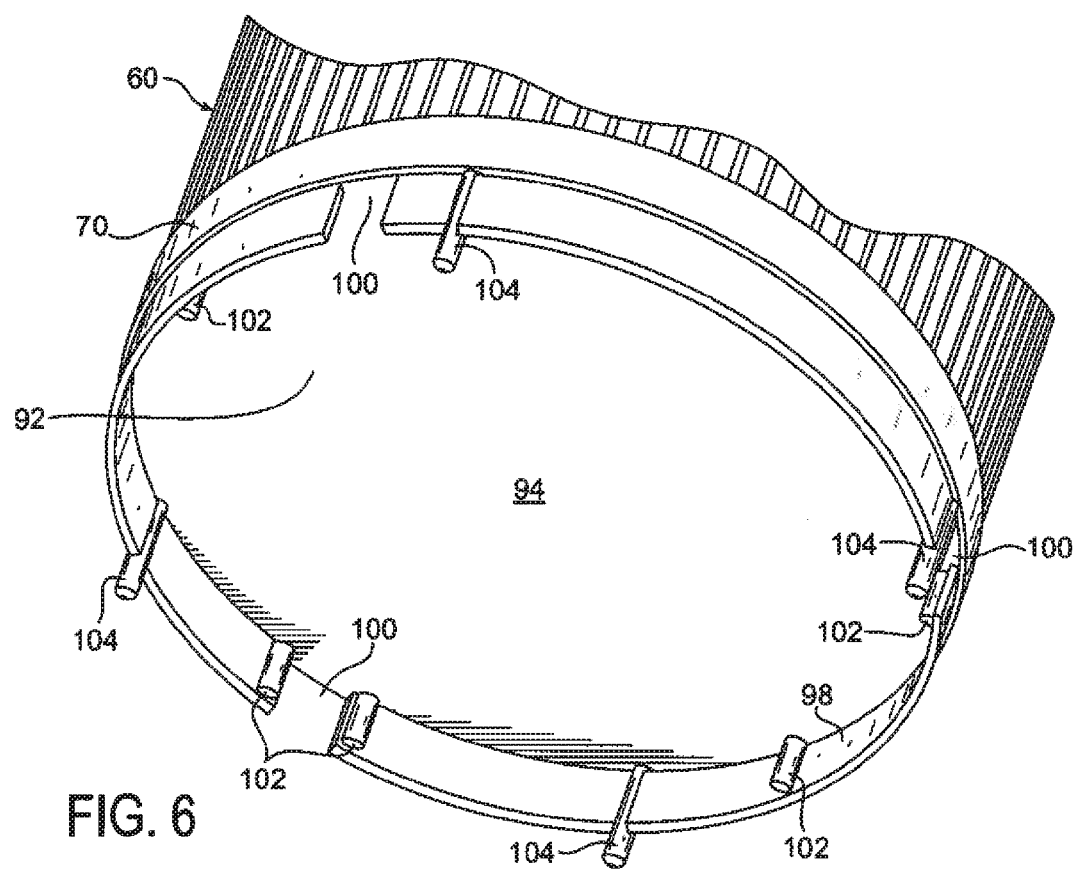
FIG. 6 is an enlarged view of the lower end cap of the filter element shown in FIG. 5.

Referring now to FIGS. 4-6, the filter assembly 10 further includes a filter element, indicated generally at 60, including a ring of filter media material 61, circumscribing a central axis and defining a central cylindrical cavity 62 (see FIG. 3). Media ring 61 can be formed of nedia material appropriate for the particular application and can be pleated (as illustrated) or layered or otherwise formed, as should be known to those skilled in the art. The element can be self-supporting (as illustrated) or a central perforated support core could be provided, depending on the application. A first, lower end cap 70 is sealingly bonded by, e.g., adhesive, to a lower end of the media ring; while a second, upper end cap 72 is sealingly bonded also by, e.g., adhesive, to the other, upper end of the media ring. Each end cap can be formed of a single piece or multiple pieces, from material appropriate for the application, e.g., plastic or metal.

Referring to FIGS. 3 and 4, the upper end cap 72 includes an annular body portion 80 defining a central circular opening 81, and an integral (preferably unitary) central portion 82 extending radially inward from the annular portion and including a cylindrical sidewall 83 and an internal base 84. Base 84 includes one or more flow passages as at 85 to allow fluid communication from the central opening 81 to the central cavity 62 of the element. An axial elongated, central projection 88 is supported by the base 84 and projects axially upward, away from the base toward the opening 81. An annular sealing member or gasket 90 is carried by the end cap and internally bounds the opening 81 for sealing against the outer diameter of the central passage 24 of the filter head. Sealing member 90 provides a fluid-tight seal with the filter head and separates the dirty fuel entering the inlet port from the filtered fuel exiting the outlet port. Projection 88 has a length sufficient to move the ball member 21 of the valve assembly 20 in the filter head upward, away from the valve seat 23 when the element is properly positioned within the housing, and open a flow path through the valve head to the downstream fuel system components, such as the engine. Further discussion on the structure and operation of a projection and cooperating valve assembly can be found in U.S. Pat. No. 5,643,446, which is incorporated herein by reference.

Referring now to FIGS. 5 and 6, the lower end cap 70 includes a flat, circular imperforate end wall 92 with an inner surface facing the media ring 61, and an outer surface 94 facing away from the media ring. An annular sidewall 98 outwardly bounds the end wall, and extends circumferentially preferably near or at the periphery of the end wall—and projecting axially downward therefrom. The sidewall 98 is formed as a series of arcuate segments, with gaps or openings 100 defined between adjacent segments. Openings 100 facilitate fluid flow around the end of the element; with the number, geometry and spacing of the openings varying depending on the particular application.

As illustrated, a series of short supporting posts 102 are provided on opposite sides of the segments ends forming the openings 100, and also in spaced apart relation around the circumference of the sidewall, to support the sidewall 98. Posts 102 generally extend about the same distance downwardly from the end wall 92 as the sidewall 98.

A series of elongated posts 104 are also provided in spaced apart relation around the circumference of the end wall and project axially downward from the lower distal edge of the sidewall 98. The posts 104 preferably all extend the same distance downwardly from the sidewall. Posts 104, as with posts 102, can be formed with the end cap during the manufacturing process, such as being molded unitarily with the end cap. As will be described below, posts 104 have a geometry that engages the ribs 60 on the inner surface of the collection bowl as the collection bowl is rotated during disassembly (and assembly) of the filter assembly. As illustrated, four such posts are shown in equally-spaced relation; however it is only necessary that the lower end cap have at least one post, and in a broader sense, have at least one projection or geometry, that can engage the ribs 60 on the collection bowl as the collection bowl is rotated.

As can be seen in FIGS. 7 and 8, the distal lower end of the sidewall 98 is supported on the upper surface 62 of the ridges 60 on the bowl, when the element is located in the filter housing. The ridges support the element axially, and ensure that the element is properly forced upwardly against the filter head. As the collection bowl is screwed onto the filter head, the ribs force the element upwardly until the projection 88 on the upper end cap 72 of the filter element forces the ball member 21 of the valve assembly 20 upwardly to open the flow path through the filter assembly, as shown in FIG. 3. When the collection bowl is fully screwed onto the head, the valve assembly is appropriately opened to allow flow through the passage 24 in the filter head due to the interaction between the projection and the valve assembly. As should be appreciated, this prevents operation of the fuel system without an element having a proper projection installed in the filter assembly.

As also can be seen in FIG. 3, when the element is properly located on the head, the sealing member 90 carried by the upper end cap is appropriately sealed around the outer diameter of the passage 24.

Referring again to FIGS. 7 and 8, also when fully assembled, the ribs 60 support the element sufficiently such that the end wall 92 of the lower end cap is sufficiently spaced away from the heating element 52. Openings 100 around the sidewall 98 facilitate flow of fuel around the lower end cap to the heating element 52 during cold weather operation. Openings 100 are spaced around the sidewall at different circumferential locations than the ribs 60 on the collection bowl, to avoid the ribs being received within the openings and blocking fluid flow therethrough. For example, the lower end cap can have three openings in the sidewall, equally spaced apart at 30 degree intervals; while the collection bowl can have four ribs, equally spaced apart at 25 degree intervals. In this way, it is ensured that the sidewall remains supported properly on the ribs, at an appropriate axial location in the housing.

The operation of the filter assembly should be apparent from the above; however in brief, the fuel entering inlet port 16 (FIG. 1) flows inwardly into the filter head, and between the head and the filter element. The fuel flows radially inward through the media, where contaminants are separated—with the water collecting and draining downwardly into the lower end of the collection bowl. The openings 100 in the sidewall of the lower end cap facilitate fuel flowing down around the lower end cap and coming into contact with the heating element 52. The fuel also passes radially inward through the element into the central cavity 62, where the filtered fluid then passes upwardly through the passages 85 in the central portion of the upper end cap, and then outwardly through central opening 81, to passage 24 and outlet port 18.

When it is desired to remove the filter element, such as when the element is spent and needs to be replaced, the bowl is screwed off the filter head. As the bowl rotates, the ribs 60 on the bowl come into contact with the elongated posts 102 on the lower end cap of the filter element, and cause the element to rotate in conjunction with the bowl. This causes the sealing element 90 at the upper end of the element to likewise rotate with respect to the filter head, and breaks the seal stiction between these elements.

As the bowl continues to be rotated and is finally removed from the head, the element remains supported by the collection bowl, which facilitates removing the element from the filter assembly, and in addition, prevents spillage of fuel. The element can then be replaced with a fresh element, and the collection bowl can then be reattached to the filter head in a reverse manner.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fuel filter assembly, comprising:
  a housing including a filter head with an inlet port and outlet port for directing fuel into and out of the housing, and a bowl threadably connected to a lower end of the head, the bowl including a series of ribs projecting radially inward from an internal sidewall of the bowl;
  a filter element located within the housing, the filter element including: i) a ring of filter media circumscribing a central axis and defining a central cavity interiorly of the ring; ii) a first end cap sealingly bonded at a lower end of the media ring; and iii) a second, annular end cap sealingly bonded at an upper end of the media ring and including a resilient sealing member bounding a central opening in the second end cap, the central opening allowing fluid communication with the central cavity of the element; the first end cap including a) an imperforate circular end wall with an inner surface facing the media ring, and an outer surface facing away from the media ring, b) an annular side wall toward or at the periphery of the end wall projecting downwardly from the outer surface of the end wall, the side wall supporting the element against an upper surface of the ribs on the bowl and including a series of openings therearound, and c) a series of axial posts projecting downwardly from the distal end of the side wall, the posts being spaced around the side wall such that they are rotationally contacted by the bowl ribs when the bowl is rotated with respect to the head to cause the element to rotate in conjunction with the bowl when the bowl is rotated relative to the head to remove the bowl from the head, wherein when the bowl and element are assembled with the head, fuel entering through the inlet port flows between the internal sidewall of the bowl and the element and then radially inward through the media ring, and contaminants in the fuel are separated by the media and can collect and pass downwardly between the bowl and the lower end cap into a lower portion of the bowl for removal, with the fuel passing through the media ring being directed out through the outlet port.

2. The fuel assembly as in claim 1, wherein the openings in the sidewall are spaced at circumferentially different spacings around the sidewall relative to the ribs on the bowl.

3. The fuel assembly as in claim 1, wherein the sidewall is configured as a series of arcuate segments, with the openings defined between adjacent segments.

4. The fuel assembly as in claim 1, wherein the posts are spaced equally around the circumference of the end wall.

5. The fuel assembly as in claim 1, wherein the posts all extend the same distance away from the distal lower end of the sidewall.

6. A filter element, comprising:
  i) a ring of filter media circumscribing a central axis and defining a central cavity interiorly of the ring; and
  ii) a first end cap sealingly bonded at an end of the media ring; the first end cap including a) an imperforate circular end wall with an inner surface facing the media ring, and an outer surface facing away from the media ring, b) an annular side wall projecting outwardly from the outer surface of the end wall toward the periphery of the end wall, the side wall including a series of openings therearound, and c) a series of posts projecting axially outwardly from the distal end of the side wall, the posts being spaced around the side wall.

7. The filter element as in claim 6, further including a second end cap sealingly bonded at another end of the media ring, the second end cap including a resilient annular sealing member bounding a central opening in the second end cap.

8. The filter element as in claim 6, wherein the sidewall is configured as a series of arcuate segments, with the openings defined between adjacent segments.

9. The filter element as in claim 6, wherein the posts are spaced equally around the circumference of the end wall.

10. The filter element as in claim 6, wherein the posts all extend the same distance away from the distal end of the sidewall.

11. A filter element, comprising:
  i) a ring of filter media circumscribing a central axis and defining a central cavity interiorly of the ring; and
  ii) a first end cap sealingly bonded at one end of the media ring and a second, annular end cap sealingly bonded at another end of the media ring, the second annular end cap including a resilient sealing member bounding a central opening in the second end cap; the first end cap including a) an imperforate circular end wall with an inner surface facing the media ring, and an outer surface facing away from the media ring, b) an annular locating feature projecting outwardly away from the outer surface of the end wall, wherein the annular locating feature includes a series of arcuate segments projecting outwardly from the outer surface of the end wall toward the periphery of the end wall, the arcuate segments defining a series of openings therebetween, and c) at least one projection projecting axially outwardly from a distal end of annular locating feature.

12. The filter element as in claim 11, wherein an axial projection projects axially outward from the distal end of each of the segments.

* * * * *